United States Patent
Knoblauch et al.

(10) Patent No.: US 9,566,852 B2
(45) Date of Patent: Feb. 14, 2017

(54) DRIVE TRAIN OF AN ALL-ELECTRICALLY DRIVABLE MOTOR VEHICLE WITH TWO ELECTRIC MACHINES

(71) Applicant: Dr. Ing. h.c. F. Porsche Aktiengesellschaft, Stuttgart (DE)

(72) Inventors: Daniel Knoblauch, Obergruppenbach (DE); Martin Fuechtner, Stuttgart (DE)

(73) Assignee: Dr. Ing h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/362,293

(22) PCT Filed: Oct. 17, 2012

(86) PCT No.: PCT/EP2012/004341
§ 371 (c)(1),
(2) Date: Jun. 2, 2014

(87) PCT Pub. No.: WO2013/083215
PCT Pub. Date: Jun. 13, 2013

(65) Prior Publication Data
US 2014/0332301 A1  Nov. 13, 2014

(30) Foreign Application Priority Data

Dec. 5, 2011 (DE) .......... 10 2011 056 046
Dec. 22, 2011 (DE) .......... 10 2011 056 928

(51) Int. Cl.
*B60K 1/02* (2006.01)
*B60K 23/08* (2006.01)
(Continued)

(52) U.S. Cl.
CPC . *B60K 1/02* (2013.01); *B60K 1/00* (2013.01); *B60K 17/02* (2013.01); *B60K 17/12* (2013.01);
(Continued)

(58) Field of Classification Search
CPC .......... B60K 1/02; B60K 17/02; B60K 17/35; B60K 17/12; B60K 2007/0061; B60K 2007/0092; B60L 15/2054
See application file for complete search history.

(56) References Cited

U.S. PATENT DOCUMENTS 3,476,200 A  *  11/1969  Schoepe  ................ B60K 17/30
                                                      180/248
5,129,476 A  *  7/1992  Kikuchi  ................... B60K 5/04
                                                      180/234
(Continued)

FOREIGN PATENT DOCUMENTS

DE       19954544 A1       8/2001
DE      102004043808       4/2006
(Continued)

OTHER PUBLICATIONS

International Search Report of Apr. 17, 2013.
German Search Report of Nov. 9, 2012.

*Primary Examiner* — Kevin Hurley
*Assistant Examiner* — Gabriela C Craciun
(74) *Attorney, Agent, or Firm* — Gerald E. Hespos; Michael J. Porco; Matthew T. Hespos

(57) ABSTRACT

A drive train (1) of an all-electrically drivable motor vehicle has a first axle (2) with a differential (6), and two electric machines (15, 16). The first axle (2) can be driven by the electric machines (15, 16) via a transmission (17). One (16) of the two electric machines (15, 16) can be decoupled from the transmission (17) via a switchable clutch (23). Different driving conditions of the motor vehicle operated by the drive train can be executed with a particularly good efficiency.

11 Claims, 4 Drawing Sheets

(51) Int. Cl.
*B60K 1/00* (2006.01)
*B60K 17/02* (2006.01)
*B60K 17/35* (2006.01)
*B60K 17/12* (2006.01)
*B60K 17/16* (2006.01)
*B60K 17/348* (2006.01)
*B60K 17/356* (2006.01)
*F16H 48/20* (2012.01)
*B60L 11/18* (2006.01)
*B60L 15/20* (2006.01)

(52) U.S. Cl.
CPC ............ B60K 17/16 (2013.01); B60K 17/348 (2013.01); B60K 17/35 (2013.01); B60K 17/356 (2013.01); B60K 23/0808 (2013.01); B60L 11/1805 (2013.01); B60L 15/2054 (2013.01); F16H 48/20 (2013.01); B60K 2001/001 (2013.01); B60L 2220/42 (2013.01); B60L 2240/421 (2013.01); B60L 2240/423 (2013.01); B60L 2240/486 (2013.01); B60L 2260/28 (2013.01); B60Y 2200/91 (2013.01); Y02T 10/645 (2013.01); Y02T 10/648 (2013.01); Y02T 10/7005 (2013.01); Y02T 10/72 (2013.01); Y02T 10/7275 (2013.01); Y10T 477/26 (2015.01)

(56) References Cited

U.S. PATENT DOCUMENTS

| | | | | |
|---|---|---|---|---|
| 6,615,946 | B2 | 9/2003 | Pasquini et al. | |
| 7,140,461 | B2* | 11/2006 | Morrow | B60K 6/387 180/65.245 |
| 7,223,200 | B2* | 5/2007 | Kojima | B60K 6/40 475/15 |
| 7,461,864 | B2* | 12/2008 | Ervin | B62D 21/08 180/298 |
| 8,083,016 | B2* | 12/2011 | Naik | B60K 6/365 180/242 |
| 8,734,281 | B2* | 5/2014 | Ai | B60K 6/445 180/65.21 |
| 8,888,638 | B2* | 11/2014 | Mueller | B60K 6/365 180/242 |
| 2003/0078134 | A1* | 4/2003 | Kojima | B60K 6/365 477/3 |
| 2005/0067199 | A1* | 3/2005 | Shimizu | B60L 15/2045 180/65.1 |
| 2008/0039257 | A1* | 2/2008 | Holmes | B60K 6/365 475/5 |
| 2010/0087996 | A1* | 4/2010 | Haggerty | B60K 6/445 701/58 |
| 2011/0192660 | A1 | 8/2011 | Chodura et al. | |
| 2011/0209934 | A1* | 9/2011 | Armbruster | B60K 7/0007 180/65.25 |
| 2011/0259657 | A1 | 10/2011 | Fuechtner | |
| 2012/0065828 | A1* | 3/2012 | Kato | B60K 6/445 701/22 |
| 2013/0075183 | A1* | 3/2013 | Kochidomari | B60K 7/0007 180/292 |
| 2014/0031168 | A1* | 1/2014 | Yang | B60K 6/547 477/3 |
| 2014/0284130 | A1* | 9/2014 | Knoblauch | B60K 1/02 180/242 |
| 2014/0335999 | A1* | 11/2014 | Knoblauch | B60K 1/00 477/5 |
| 2015/0021109 | A1* | 1/2015 | Knoblauch | B60K 1/02 180/65.1 |
| 2015/0027245 | A1* | 1/2015 | Perakes | B60K 25/06 74/15.82 |
| 2015/0096814 | A1* | 4/2015 | Maeda | B62D 11/003 180/6.28 |
| 2015/0096821 | A1* | 4/2015 | Arai | B60K 17/02 180/233 |
| 2015/0226297 | A1* | 8/2015 | Knoblauch | B60L 15/2054 475/150 |

FOREIGN PATENT DOCUMENTS

| | | |
|---|---|---|
| DE | 102009051124 | 5/2011 |
| DE | 202011109790 | 6/2012 |
| FR | 2930743 | 11/2009 |
| JP | 2008253038 | 10/2008 |
| WO | 2011076542 | 6/2011 |
| WO | 2012009744 | 1/2012 |

* cited by examiner

DRIVE TRAIN OF AN ALL-ELECTRICALLY DRIVABLE MOTOR VEHICLE WITH TWO ELECTRIC MACHINES

BACKGROUND

1. Field of the Invention

The invention relates to a drive train of an all-electrically drivable motor vehicle, having a first axle which has a differential, and having two electric machines, it being possible for the first axle to be driven by means of the electric machines via a gear mechanism.

2. Description of the Related Art

A drive train of this type which is used for an electrically drivable earth-moving vehicle or for an agricultural vehicle with four-wheel drive is known from DE 600 13 340 T2. Said drive train has two electric machines which are arranged in the driving direction above the one rear axle and interact with a spur gear mechanism which is arranged in front of the rear axle. The gear mechanism is connected via a shaft or two shafts to differentials which are assigned to the two axles, that is to say the rear axle and the front axle.

It is an object of the present invention to provide a drive train in a motor vehicle which is to be operated in an all-electrical manner, by means of which drive train different driving states can be driven with a particularly satisfactory degree of efficiency.

SUMMARY OF THE INVENTION

The drive train of the all-electrically drivable motor vehicle therefore has two electric machines, by means of which the first axle can be driven via a gear mechanism. It is essential here that one of the two electric machines can be decoupled from the gear mechanism by means of a switchable clutch. This decoupling capability of the one electric machine makes it possible to manage different driving states in an optimum manner. For instance, the first axle is, in particular, driven only by means of one electric machine when the first axle is not to be driven with a maximum torque or maximum power output. If this is desired, the second electric machine is switched on. The drive train can therefore be operated with an optimum degree of efficiency, by either only the one electric machine or both electric machines interacting with the first axle and optionally being connected in a non-positive manner to a second axle of the motor vehicle, in particular the front axle, if the drive train is configured as an all-wheel drive means.

If the electric machine is decoupled, it can then be switched off.

It is provided according to one preferred development of the invention that the clutch is active in a positively locking or non-positive manner. If the clutch is active in a positively locking manner, it can be switched only at a relatively low rotational speed, whereas, in the case of a non-positively active clutch, it can also be switched under slip, and thus at relatively great rotational speed differences of the driven shaft of the electric machine and the input shaft of the gear mechanism.

The drive train is used, in particular, in a motor vehicle which is configured as a passenger motor vehicle. Said passenger motor vehicle is, in particular, a sports car. Said motor vehicle, in particular the passenger motor vehicle or the sports car, is preferably configured as a rear-wheel-drive vehicle. The electric machines are therefore arranged in the rear region of the motor vehicle or the drive train. The electric machines are therefore situated close to the first, rear axle. It is provided, in particular, that said rear axle is situated in front of the electric machines.

In principle, however, the motor vehicle can be configured as a front-wheel-drive vehicle. In this case, the electric machines are therefore situated in the region of the second, front axle of the drive train, in particular in front of said axle.

The drive train can certainly be one of an all-electrically all-wheel drivable motor vehicle. In this case, it is only necessary to provide a torque-transmitting connection between the first and second axle.

The wheels which are assigned to the drive train are preferably suspended independently via articulated shafts. In this case, the drive train does not have live axles.

It is considered to be particularly advantageous if both electric machines are connected to one another via a constant transmission ratio.

It is provided according to one advantageous variant that a shaft of the gear mechanism can be driven by means of the two electric machines, and a bevel gear toothing system has a pinion and a ring gear, the pinion being connected to said gear mechanism shaft and it being possible for the differential of the first axle to be driven by means of the ring gear. The gear mechanism is preferably a spur gear mechanism. In this case, the differential of the first axle can certainly be assigned a spur gear.

The spur gear mechanism preferably has an intermediate shaft between the driven shafts of the electric machines and the first axle.

The drive train can be of very compact design on account of this described design in the region of the first axle and the electric machines and the gear mechanism which is situated between them.

The gear mechanism has, for example, an input shaft, the electric machines interacting with ends of the input shaft which are remote from one another. Secondly, the gear mechanism can certainly have two input shafts, each input shaft being assigned one electric machine. In the context according to the invention, one of the two electric machines can be decoupled from the gear mechanism by means of the switchable clutch.

The gear mechanism has, in particular, a common output shaft for both electric machines. Said output shaft interacts with a differential of the first axle, whereby the two axle halves of the first axle, and therefore the wheels which are assigned to the first axle, can be driven via said differential. If the drive train is configured as an all-wheel drive means, and therefore with the two driven axles, it is considered to be advantageous if the second axle has a differential and the differentials of the two axles are connected to one another by means of a shaft for the purpose of all-wheel operation of the motor vehicle. Said shaft is, in particular, an articulated or cardan shaft. Said shaft or cardan shaft can certainly be assigned a controllable clutch, in particular a hang-on clutch.

Further features of the invention result from the subclaims, the appended drawing and the description of the preferred exemplary embodiments which are illustrated in the drawing, without being restricted hereto.

DETAILED DESCRIPTION OF THE PREFERRED EMBODIMENTS

Figure 1:
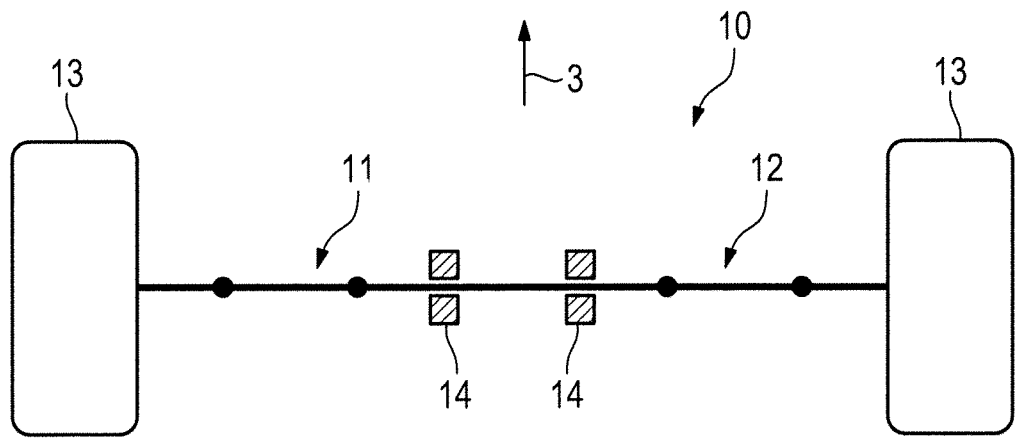
FIG. 1 shows an outline illustration of a first embodiment of the drive train according to the invention.
Figure 1:
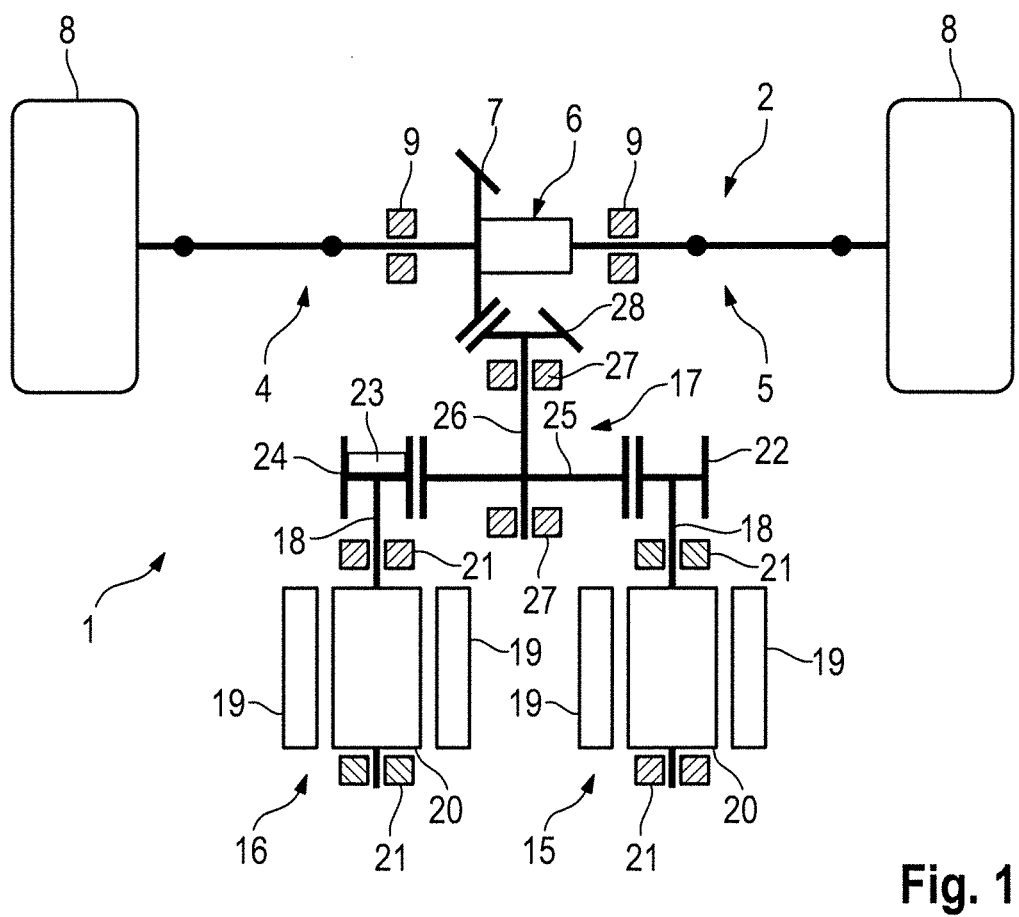

The exemplary embodiment according to FIG. 1 illustrates a drive train for an all-electrically drivable motor vehicle which is, in particular, a passenger motor vehicle, in specific terms a sports car. The drive train which is assigned to the rear axle of the motor vehicle is shown and, furthermore, a non-driven front axle of the motor vehicle is also shown.

The drive train 1 with independent suspension has the first, rear axle 2. In relation to the forward driving direction 3 of the motor vehicle, called the driving direction in the following text, the rear axle 2 has a left-hand axle section 4 and a right-hand axle section 5. The two axle sections 4 and 5 are driven by means of a differential 6 of the rear axle 2. The differential 6 has a ring gear 7. The reference numeral 8 denotes the left-hand and the right-hand wheel of the rear axle 2 and the reference numeral 9 denotes bearings for the axle sections 4 and 5 of the rear axle 2. The axle sections 4 and 5 of the rear axle 2 have articulated shafts.

Furthermore, the motor vehicle has a second, front axle 10 which is not driven. Said axle 10 also has an independent suspension. The front axle 10 has a left-hand axle section 11 and a right-hand axle section 12. The reference numeral 13 denotes the left-hand and right-hand wheel of the front axle 10 and the reference numeral 14 denotes the bearings for the axle sections 11 and 12 of the front axle 10. The axle sections 11 and 12 of the front axle 10 likewise have articulated shafts.

The rear axle 2 can be driven by means of two electric machines 15 and 16 via a gear mechanism 17. Here, the gear mechanism 17 is arranged behind the rear axle 2, and the two electric machines 15 and 16 are arranged in each case in the driving direction 3, and the rotational axis of the respective electric machine 15 or 16, represented by its driven shaft 18, is therefore arranged in the driving direction 3.

The stator of the respective electric machines 15 and 16 is denoted by the reference numeral 19, and the rotor of the respective electric machines 15 and 16, to which the driven shaft 18 is connected, is denoted by the reference numeral 20. The respective driven shaft 18 is mounted in bearings 21.

The gear mechanism 17 is configured substantially as a spur gear mechanism. A pinion 22 which is configured as a spur gear is connected fixedly to the driven shaft 18 of the right-hand electric machine 15 so as to rotate with it. The driven shaft 18 of the left-hand electric machine 16 is connected to a pinion 24 by a switchable clutch 23, also called a separating clutch. The pinions 22 and 24 have an identical pitch circle and an identical number of teeth. When the clutch 23 is switched, the pinion 24 is connected to the driven shaft 18 of the electric machine 16 in a torque-transmitting manner. If the clutch 23 is open, no transmission of torque takes place between the electric machine 16 and the pinion 24. In this case, the electric machine 16 can be switched off.

The clutch is a clutch 23 which is active in a positively locking or non-positive manner. If the clutch 23 is opened, the gear mechanism 17 is therefore driven exclusively by means of the electric machine 15. If the clutch 23 is closed, the gear mechanism 17 is driven by means of both electric machines 15 and 16.

The pinions 22 and 24 which are assigned to the two driven shafts 18 of the electric machines 15 and 16 mesh with a common spur gear 25 of the gear mechanism, the spur gear 25 being connected to a shaft 26. Said shaft 26 is mounted in bearings 27. A pinion 28 which is configured as a bevel gear is connected to the shaft 26 which extends in the driving direction 3, in the region of the front end of said shaft 26. Said pinion 28 meshes with the ring gear 7 and therefore forms a bevel gear toothing system with the latter. The ring gear 7 can therefore be driven via the pinion 28, said ring gear 7 driving the differential 6 of the rear axle 2, whereby the two rear wheels 8 are driven via the axle sections 4 and 5.

If only a torque or a power output which corresponds to considerably below the maximum torque or the maximum power output of the two electric machines 15 and 16, considered together, is required for driving the motor vehicle, it is sufficient, if the clutch 23 is open, to operate the drive train exclusively by means of the electric machine 15. Only if a greater torque or a higher power output is required for driving the motor vehicle is the other electric machine 16 switched on by closing the clutch 23. When, in particular, the clutch 23 is active in a non-positive manner, it can be switched in the presence of slip.

Figure 2:
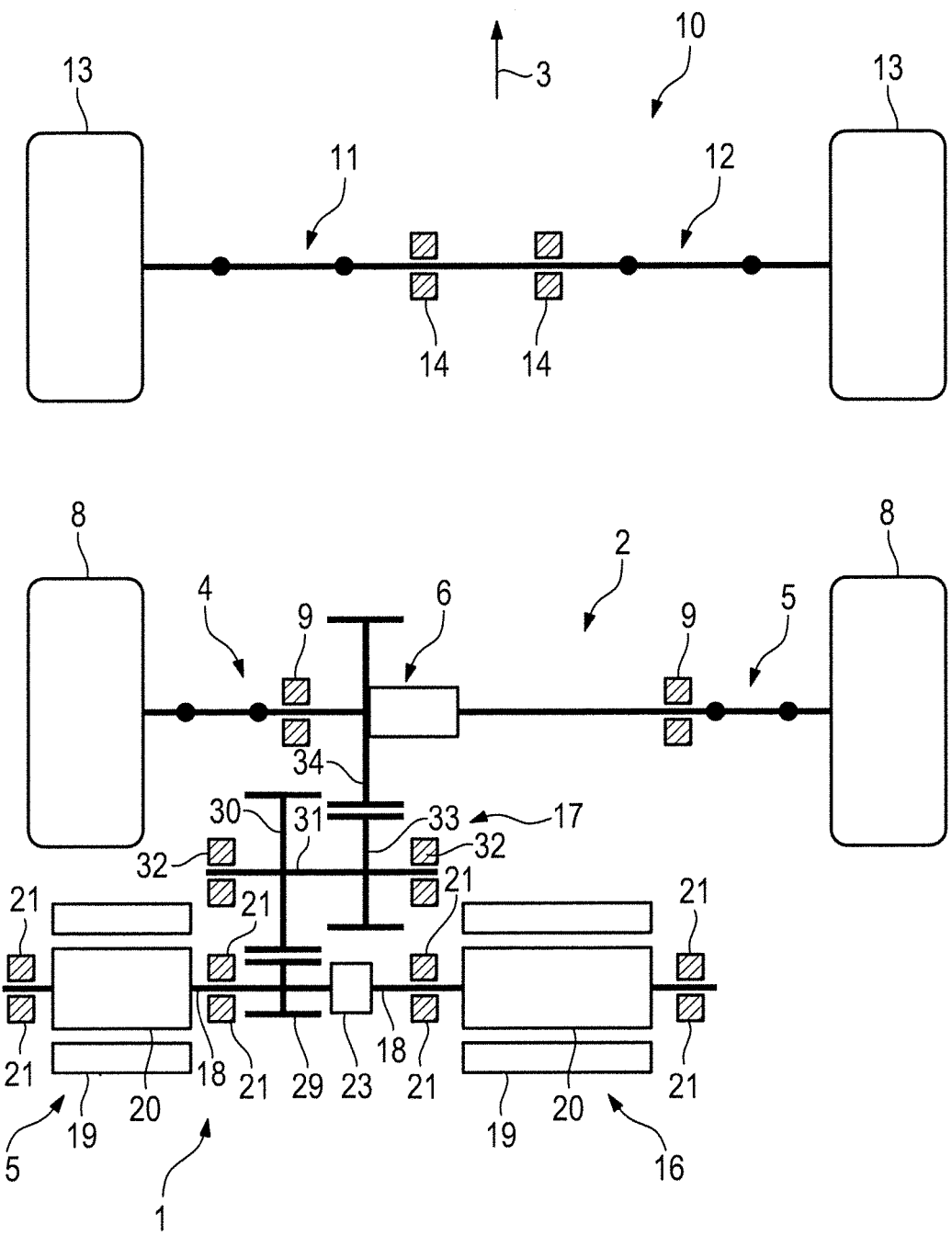
FIG. 2 shows an outline illustration of a second embodiment of the drive train according to the invention.

The embodiment according to FIG. 2 differs from that according to FIG. 1 in that the two electric machines 15 and 16 are arranged transversely with respect to the forward driving direction 3 and, accordingly, the gear mechanism 17 is modified, since the shafts of the gear mechanism are likewise arranged transversely with respect to the forward driving direction 3. In the embodiment according to FIG. 2, components, the construction and function of which correspond to those of the embodiment according to FIG. 1, are denoted by the same reference numerals for the sake of simplicity.

In detail, FIG. 2 shows that the gear mechanism 17 and the two electric machines 15 and 16 are arranged behind the rear axle 2. Here, the gear mechanism 17 is positioned between electric machines 15 and 16 and the rear axle 2. The driven shaft 18 of the electric machine 15 which is shown on the left in this case is connected fixedly to a pinion 29 so as to rotate with it. The driven shaft 18 of the other electric machine 16 which is arranged on the right in this case is also connected fixedly to said pinion 29 so as to rotate with it, said driven shaft 18, however, being assigned the switchable clutch 23. If the clutch 23 is switched, the electric machine 16 does not transmit any torque to the pinion 29; this is the case only if the clutch 23 is closed. If the clutch 23 is open, the electric machine 16 is preferably switched off.

A spur gear 30 meshes with the pinion 29, which spur gear 30 is connected fixedly to a shaft 31 so as to rotate with it, which shaft 31 is arranged transversely with respect to the forward driving direction 3 and is mounted in bearings 32. Between said bearings 32, the shaft 31 supports a pinion 33 fixedly so as to rotate together, which pinion 33 meshes with a spur gear 34 of the differential 6.

In this embodiment, a torque can therefore be introduced into the rear axle 2 exclusively by means of the electric machine 15 if the clutch 23 is open, or else, if the clutch 23 is closed, the torque can be introduced into the rear axle 2 via the two electric machines 15 and 16.

Figure 3:
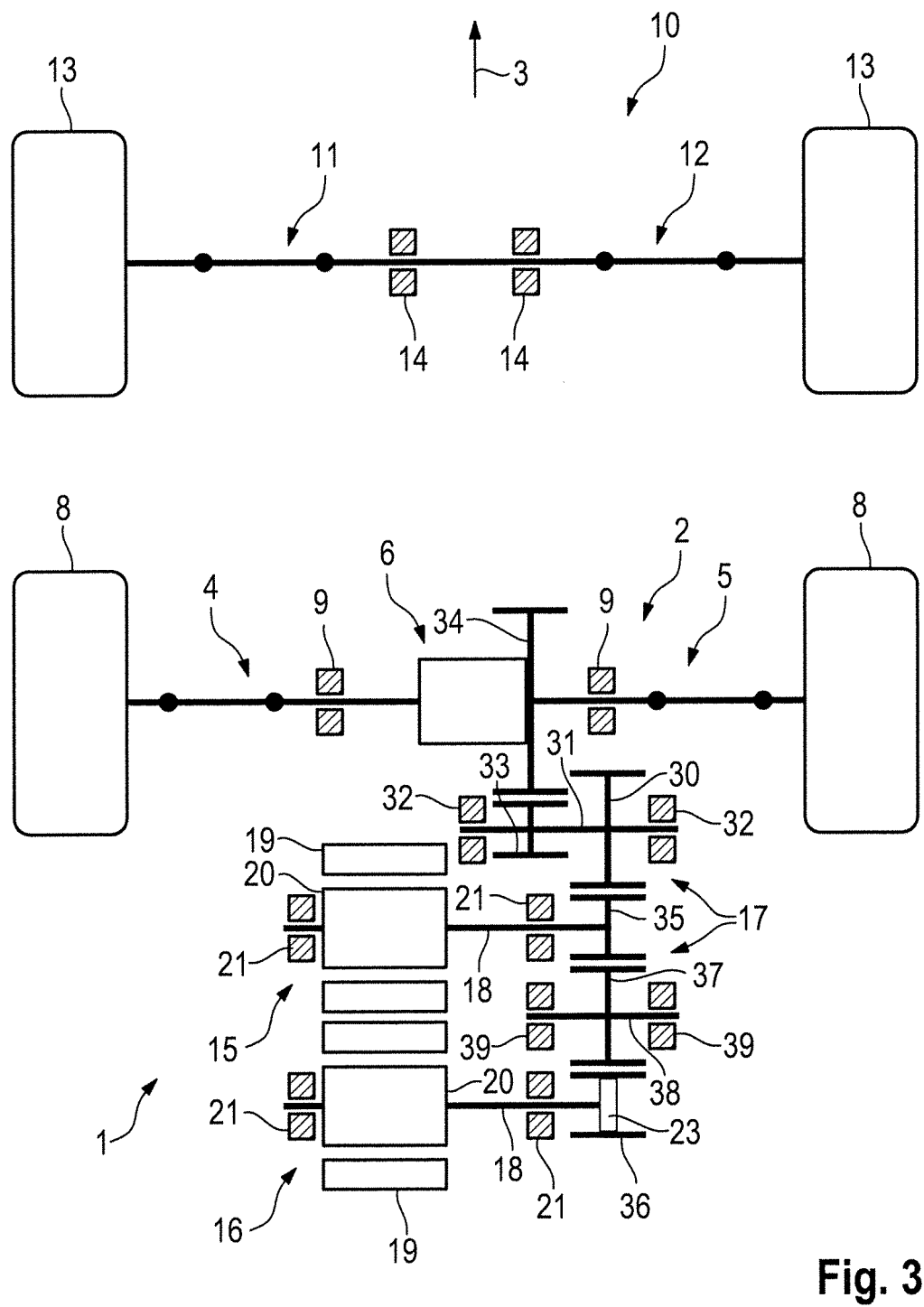
FIG. 3 shows an outline illustration of a third embodiment of the drive train according to the invention.

The embodiment according to FIG. 3 is largely similar to that according to FIG. 2, with the result that components which coincide in terms of their construction or their function with said embodiment are denoted by the same reference numerals for the sake of simplicity.

In the embodiment according to FIG. 3, however, the two electric machines 15 and 16 are arranged one behind another and the gear mechanism 17 is arranged on the right next to the electric machines 15 and 16. The driven shaft 18 of the electric machine 15 is connected fixedly to a pinion 35 so as to rotate with it. Said pinion 35 meshes with the spur gear 30 which is connected fixedly to the shaft 31 so as to rotate with it. The driven shaft 18 of the other electric machine 16 is connected via the switchable clutch 23 to a pinion 36 which corresponds to the pinion 35 with regard to the pitch circle diameter and the number of teeth. Both pinions 35 and 36 mesh with a spur gear 37 which is connected fixedly to an intermediate shaft 38 so as to rotate with it, which intermediate shaft 38 is mounted in bearings 39. If the clutch 23 is open and, in particular, the electric machine 16 is switched off, the rear axle 2 is driven only by means of the electric machine 15. If the clutch 23 is closed, the electric machine 16 additionally drives the rear axle 2.

Figure 4:
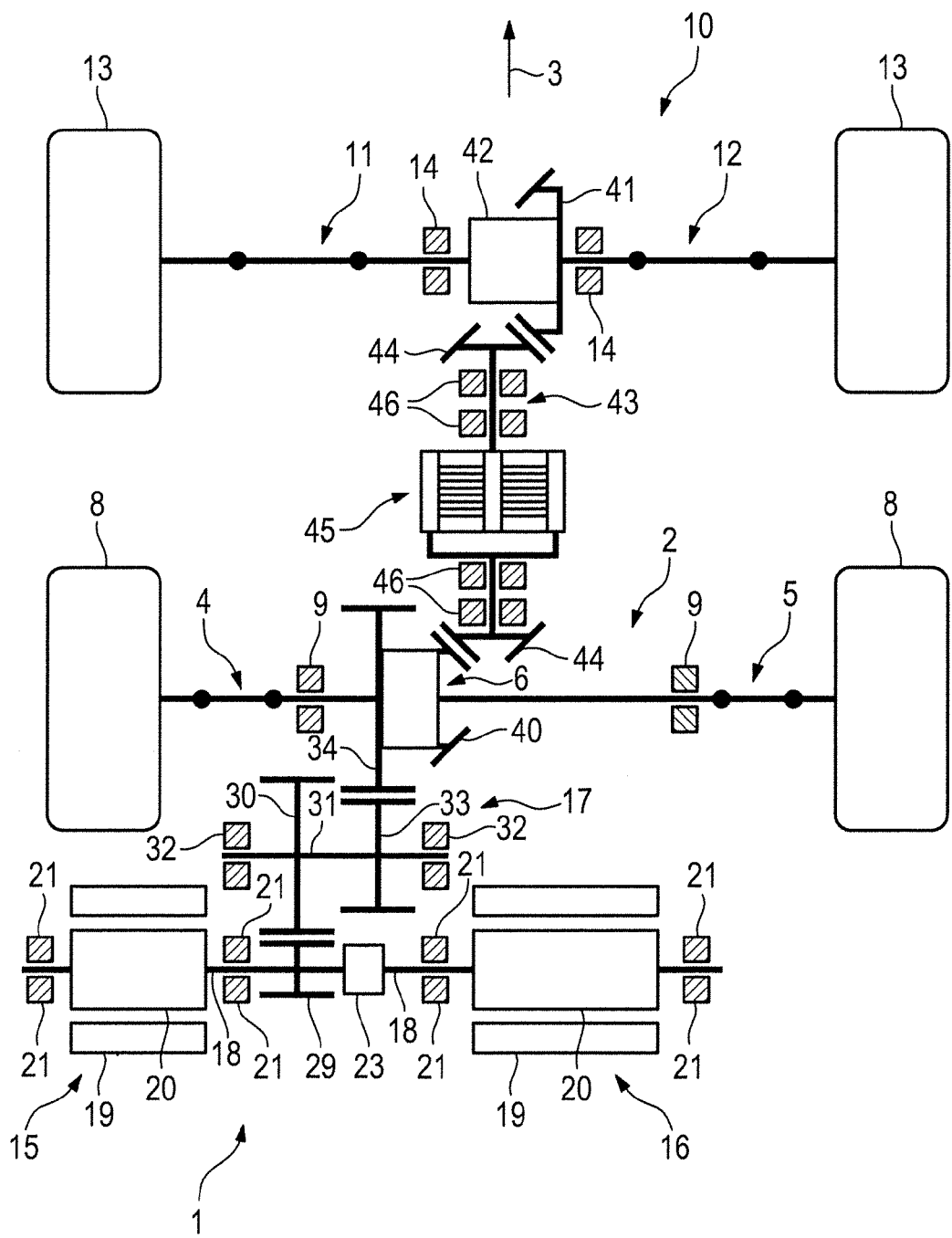
FIG. 4 shows an outline illustration of a fourth embodiment of the drive train according to the invention.

The embodiment according to FIG. 4 differs from that according to FIG. 2 only in that, instead of the drive of only the rear axle of the motor vehicle, in accordance with the embodiment according to FIG. 2, both axles of the motor vehicle can now be driven; this is therefore an all-wheel operated version. In the embodiment according to FIG. 4, the drive train therefore extends to the axles 2 and 10. In the embodiment of the drive train 1 according to FIG. 4, components, the construction and function of which correspond to those of the embodiment according to FIG. 2, are denoted by the same reference numerals for the sake of simplicity.

In order for it to be possible to drive the second, front axle 10 in the embodiment according to FIG. 4, the first, rear, driven axle 2 has a ring gear 40 and the second, front axle 10 likewise has a ring gear 41. The ring gear 40 is provided on the differential 6, in particular is connected to a differential housing of said differential 6. The other ring gear 41 is provided on a differential 42 of the front axle 10, in particular is likewise connected to a differential housing of said differential 42. The two ring gears 40 and 41 are connected via a shaft 43 which supports pinions 44 at its respective ends. The shaft 43 additionally has a controllable clutch 45 in the manner of a hang-on clutch. Since a respective pinion 44 engages into a respective ring gear 40 or 41, a torque can be transmitted by means of the shaft 43 from the first, driven, rear axle 2 to the second, front axle 10. The pinions 44 can be of different size.

If the differential 6 is configured as a torque vectoring differential, different torques can be introduced into the axle sections 4 and 5.

The reference numeral 46 denotes the bearings of the shaft 43 which are arranged on both sides of the clutch 45. The respective axle section 4 and 5 is mounted in a bearing 9 and in the differential 6.

The invention claimed is:

1. A drive train of an all-electrically drivable motor vehicle, comprising: a first axle with a first differential, a second axle with a second differential, first and second electric machines provided respectively with first and second driven shafts that are coaxial with one another and substantially parallel to the first and second axles, a gear mechanism arranged so that the first and second electric machines can drive the first axle and a switchable clutch arranged between the second electric machine and the gear mechanism so that the second electric machine can be decoupled from the gear mechanism, the first and second differentials being provided respectively with first and second differential housings formed respectively with first and second ring gears thereon, the first and second ring gears being connected to one another by a shaft for all-wheel operation of the motor vehicle, the shaft having a controllable clutch between the first differential and the second differential for selectively disconnecting the second axle from the gear mechanism and the electric machines, whereby selective operation of the switchable clutch and the controllable clutch enables the first electric machine to drive one or both of the axles and enables both of the electric machines to drive one or both of the axles.

2. The drive train of claim 1, wherein the two electric machines are arranged in a driving direction of the motor vehicle or transversely with respect to the driving direction of the motor vehicle.

3. The drive train of claim 1, wherein the first axle is a rear axle of the motor vehicle.

4. The drive train of claim 3, wherein the electric machines are arranged behind the rear axle.

5. The drive train of claim 1, wherein the drive train is a drive train of a sports car.

6. The drive train of claim 1, wherein the gear mechanism comprises a spur gear mechanism.

7. The drive train of claim 6, wherein the spur gear mechanism has an intermediate shaft between driven shafts of the electric machines and the first axle.

8. The drive train of claim 1, wherein the clutch is arranged between a driven shaft of the one electric machine and an input shaft of the gear mechanism.

9. The drive train of claim 1, wherein the gear mechanism has a common input shaft for the electric machines.

10. The drive train of claim 1, wherein at least one of the first axle and the second axle has articulated shafts for the independent suspension of wheels of the at least one axle.

11. The drive train of claim 1, wherein the clutch is active in a positively locking or frictional manner.

* * * * *